United States Patent [19]

Tatsumi

[11] Patent Number: 5,764,287

[45] Date of Patent: Jun. 9, 1998

[54] IMAGE PICKUP APPARATUS WITH AUTOMATIC SELECTION OF GAMMA CORRECTION VALVE

[75] Inventor: Shingo Tatsumi, Kanagawa-ken, Japan

[73] Assignee: Canon Kabushiki Kaisha, Tokyo, Japan

[21] Appl. No.: 790,755

[22] Filed: Jan. 27, 1997

Related U.S. Application Data

[63] Continuation of Ser. No. 384,241, Feb. 6, 1995, abandoned, which is a continuation of Ser. No. 112,790, Aug. 26, 1993, abandoned.

[30] Foreign Application Priority Data

| Aug. 31, 1992 | [JP] | Japan | 4-255669 |
| Dec. 21, 1992 | [JP] | Japan | 4-356251 |
| Dec. 25, 1992 | [JP] | Japan | 4-358967 |

[51] Int. Cl.$^6$ .................................................. H04N 5/202
[52] U.S. Cl. .................................. 348/254; 358/455
[58] Field of Search .......................... 348/254; 358/455, 358/456, 457, 500, 532; 382/272, 176; H04N 5/202

[56] References Cited

U.S. PATENT DOCUMENTS

| 4,489,349 | 12/1984 | Okada | 358/168 |
| 4,709,274 | 11/1987 | Tanioka | 358/455 |
| 5,019,909 | 5/1991 | Sawachi | 358/164 |
| 5,278,919 | 1/1994 | Sugiura et al. | 382/176 |

*Primary Examiner*—Andrew I. Faile
*Assistant Examiner*—Andrew B. Christensen
*Attorney, Agent, or Firm*—Robin, Blecker & Daley

[57] ABSTRACT

In an image pickup apparatus arranged to carry out a predetermined signal processing action including a gamma correction process on a signal outputted from an image sensor and to invert the signal during the process of the signal processing action, a varying circuit is arranged to vary a gamma value to be used for the gamma correction process.

24 Claims, 15 Drawing Sheets

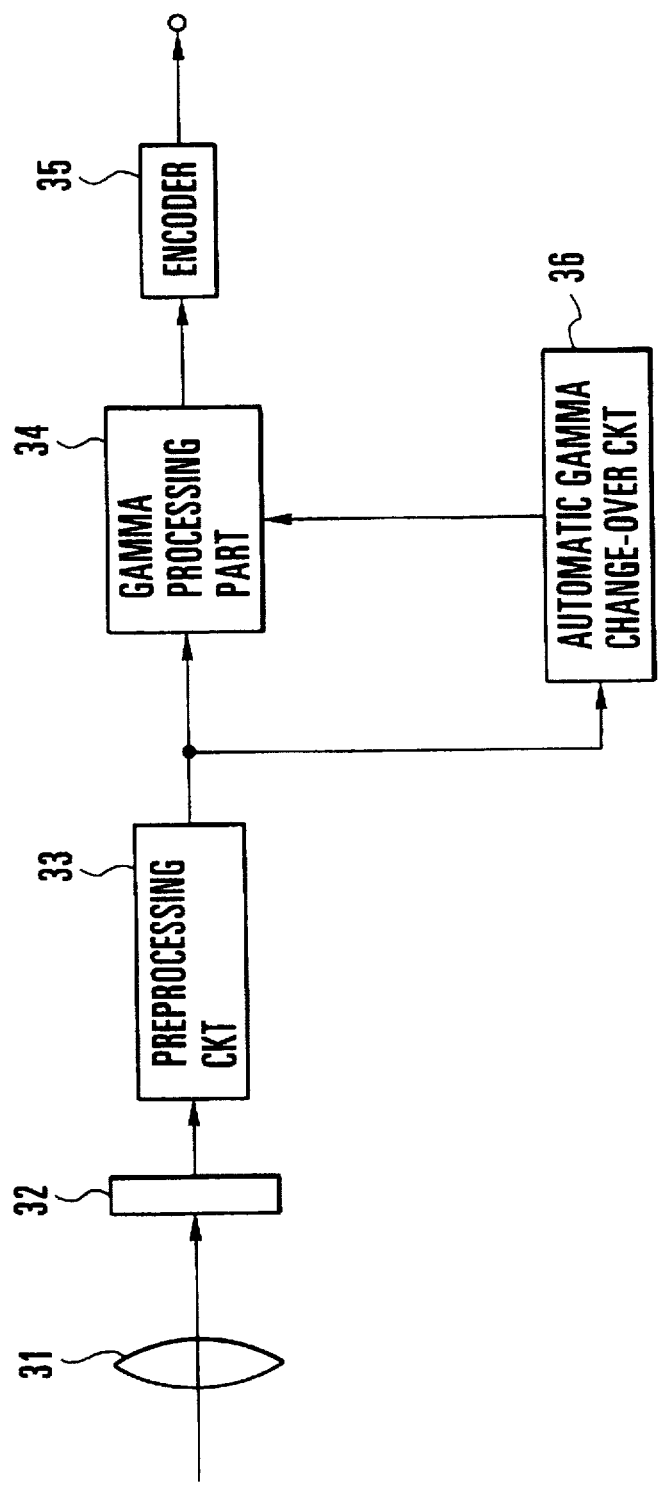

FIG.9
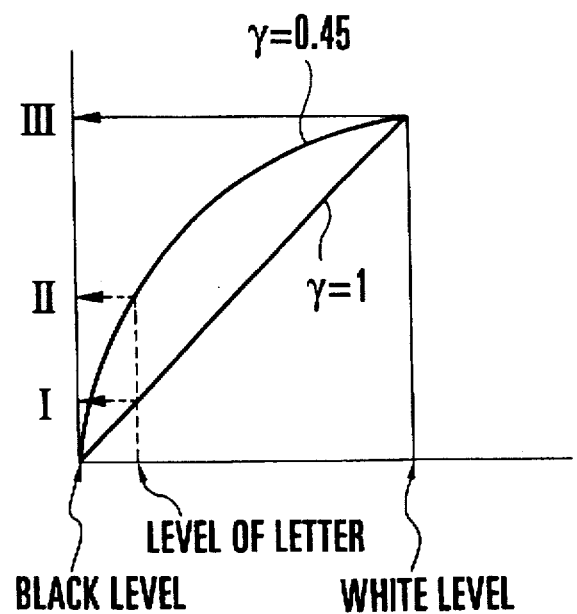
FIG.10(a)    FIG.10(b)
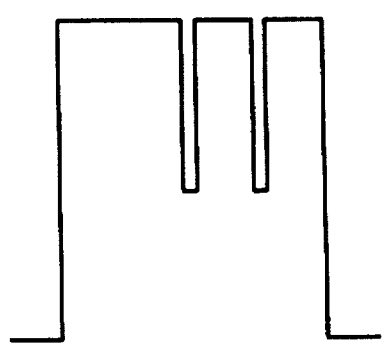 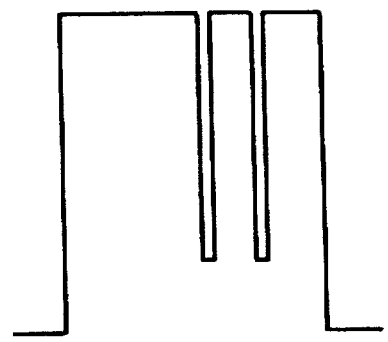

FIG.15(a)  FIG.15(b)  FIG.15(c)
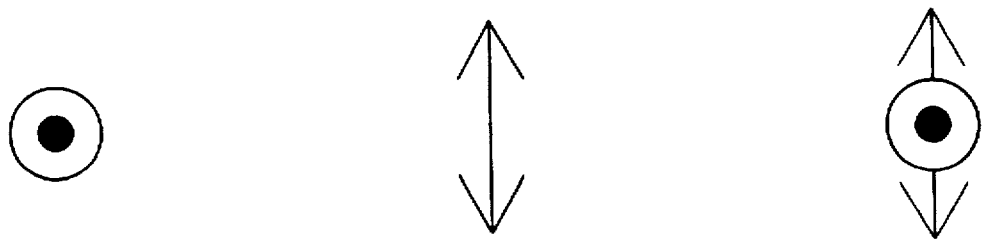
FIG.16
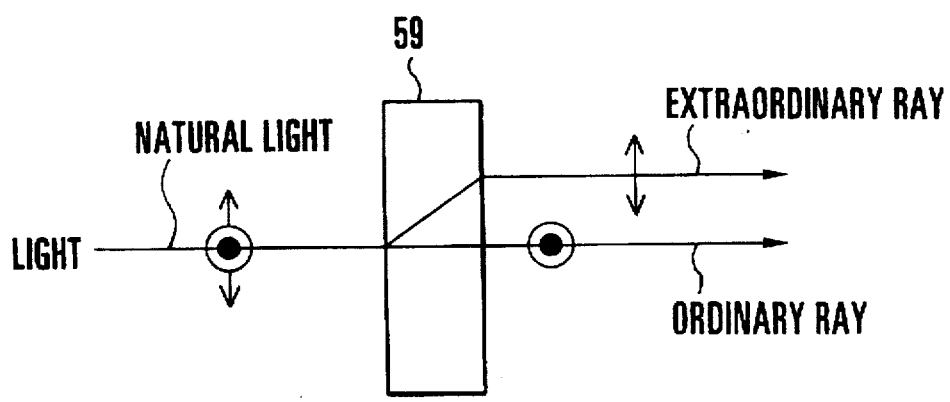
FIG.17(a)  FIG.17(b)
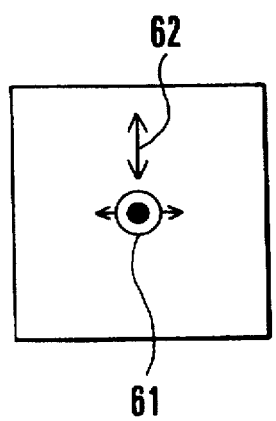
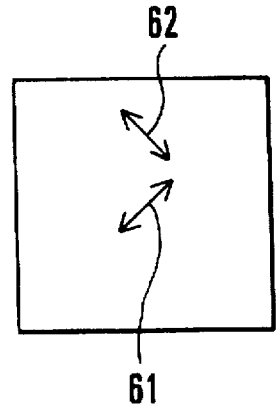

IMAGE PICKUP APPARATUS WITH AUTOMATIC SELECTION OF GAMMA CORRECTION VALVE

This is a continuation application under 37 CFR 1.62 of prior application Ser. No. 08/384,241, filed Feb. 6, 1995, abandoned, which is a continuation of application Ser. No. 08/112,790, filed Aug. 26 1993, abandoned.

BACKGROUND OF THE INVENTION

1. Field of the Invention

This invention relates to a video camera having a negative/positive inverting function for inverting a positive image into a negative image and vice versa.

2. Description of the Related Art

FIG. 1 shows the arrangement of the conventional video camera having the negative/positive inverting function. Referring to FIG. 1, light from an object of shooting 1 comes through a lens 2 and an iris 3 to an image pickup part 4 which includes a solid-state image sensor such as a CCD. The image pickup part 4 then performs a photoelectric conversion process on the light of the object to obtain R (red), G (green) and B (blue) color signals. The R, G and B signals are applied to a processing circuit 5 to be subjected to a white balance adjustment process, a gamma correction process, a matrix process, etc. A luminance signal Y and color-difference signals R-Y and B-Y are obtained through these processes.

These signals Y, R-Y and B-Y are inverted by inversion circuits 6, 7 and 8 and are then applied to an encoder 9. The encoder 9 modulates the signals R-Y and BY in a balanced manner. The signals R-Y and B-Y are added together and are further combined with the signal Y into a video signal, which is outputted from the encoder 9.

If the object 1 is a negative photographic film, for example, the processes mentioned above invert the negative image on the film to give a video signal for a positive image. In a case where the object 1 is a normal positive image, the positive image is inverted to give a video signal for a negative image, so that a special effect can be attained.

The details of the inverting process to be carried out by the inversion circuits 6, 7 and 8 can be mathematically expressed as follows.

inverted Y=A−Y (A: a constant)

inverted (R−Y)=−(R−Y)

inverted (B−Y)=−(B−Y)

The luminance signal Y is inverted by subtracting the luminance signal Y from a certain reference level. The color-difference signals are inverted by inverting the polarity of them.

In a case where a negative photographic film is used as the object 1, the positive image obtained from the video signal outputted from the conventional video camera having the negative/positive inverting function has a low luminance level and a small amount of color saturation. The image thus obtained is too dark as a whole and too faint in color. The reason for this is as follows.

As is well known, the negative photographic film has such a characteristic that a relation between the quantity of light incident on the film surface and the blackening amount of the film is nonlinear. This is called a gamma characteristic. The gamma characteristic shows a smaller amount of change in a part having a larger amount of incident light. In other words, the image is printed on the film surface in such a way as to have the image compressed at a part where the luminance level is high. Therefore, in the output obtained by photoelectrically converting the light of the negative film at the image pickup part 4, a part corresponding to a high luminance part of a photographed object is also compressed.

This state is shown in FIGS. 2(a) to 2(e), which are waveform charts obtained by using a gray scale chart as an object of shooting. FIG. 2(a) shows a luminance distribution of a gray scale chart obtained before taking a photograph. Horizontal positions are indicated on the axis of abscissa. Luminance levels are indicated on the axis of ordinate. This gray scale chart consists of a part where the luminance gradually decreases from the left to the right, another part where the luminance gradually increases from the left to the right and a middle part having a high luminance area vertically extending in a strip-like shape with black parts on both sides of the high luminance part. The luminance distributions of these parts are shown as obtained on one and the same plane.

FIG. 2(b) shows an output signal of the image pickup part 4 which is, for example, the G signal. The output signal corresponds to a distribution of blackening amounts of a negative film which is used as the object 1. The distribution is shown upside down, with respect to FIG. 2(a). Further, as mentioned above, the lower part of FIG. 2(b), which corresponds to the high luminance part of the FIG. 2(a), shows a nonlinear shape due to the gamma characteristic γ of the film. In FIG. 2(b), broken lines represent the output characteristic of the image pickup part 4 obtained in a case where the blackening amount characteristic of the negative film is linear.

As the signal which is as described above is inputted to the processing circuit 5, the white balance of the signal is adjusted. After the white balance adjustment, the signal is subjected to a gamma process with a gamma value of 0.45 for use in the video camera in this instance. Through these processes, the waveform of the signal becomes as shown in FIG. 2(c). As shown, the high level part of FIG. 2(b) is compressed. In FIG. 2(c), broken lines show the levels obtained before the gamma process. The R and B signals are processed in the same manner as the G signal. After this, a matrix process is performed to generate the signal Y and the signals R-Y and B-Y. Since the matrix process is of a so-called linear matrix type, the characteristic obtained before inputting to the matrix is reflected as it is in the output.

In other words, as shown in FIG. 2(d), the signal Y is inverted into a shape which is as a whole compressed from the original level of the object 1. The shapes of the color-difference signals R-Y and B-Y of course likewise become compressed shapes. Then, when these signals Y, R-Y and B-Y are applied respectively to the inversion circuits 6, 7 and 8, they are inverted in their compressed states. Their levels thus become lower than normal output levels as shown in FIG. 2(e). As a result, an image thus obtained on a picture plane is dark as a whole, weak in contrast and faint in color. Besides, since the gamma value of the film does not coincide with that of the video camera, the gradation of the image also becomes unnatural.

As is well known, a document camera apparatus (a video visualizer) has been commercialized as a camera appliance. The document camera apparatus is arranged to pick up, from above, an image of a document or the like placed on a copyboard, to output the image to a TV monitor or to a computer. The document camera apparatus Ls usable not only for things written on a paper sheet but also in picking up an image of a three-dimensional object for a presentation.

The conventional document camera apparatus which has been used for the above-stated purposes has presented a problem, which is as follows. Since a video camera is usually used for the document camera apparatus, a gamma process is applied to the level of the signal of the picked up image. However, the gamma value for the video camera is normally set at 0.45. As a result, a high level signal is compressed. The gamma correction which is made in this manner generally gives a large dynamic range in picking up an image of an ordinary natural thing. However, in a case where an image of a document or the like is to be picked up by means of an ordinary video camera, the gamma correction tends to result in a compressed contrast to impair the legibility of letters included in the document.

SUMMARY OF THE INVENTION

This invention is directed to the solution of the above-stated problems of the prior art. Therefore, it is an object of this invention to provide a camera apparatus which is arranged to give a good image having an adequate contrast when the camera apparatus is used as a document camera apparatus.

A camera apparatus arranged according to this invention as one embodiment thereof comprises a lens arranged to form an optical image of an object on an image pickup plane, image pickup means arranged to photoelectrically convert the optical image formed by the lens into an electrical signal, a gamma processing circuit arranged to perform a nonlinear gamma correction process on the level of an output of the image pickup means, the gamma processing circuit having at least two different gamma values selectably set, an encoder circuit arranged to convert an output of the gamma processing circuit into a video signal through necessary processes and to output the video signal, and an automatic gamma switching circuit arranged to make a discrimination, from an average value level and a peak level of the signal obtained before the gamma correction process, as to whether the signal before the gamma correction process is obtained by picking up an image of letters or by picking up an image of a natural thing and to automatically select one of the gamma values set at the gamma processing circuit according to a result of the discrimination.

The above-stated embodiment is arranged to automatically make a discrimination between an object of shooting which is letters and an object of shooting which is a natural thing and to impart a contrast to the picked-up image by automatically changing the value at which the gamma correction is to be made from an ordinary value in a case where the object is letters.

It is another object of this invention to provide a video camera having a negative/positive inverting function which is arranged to enable the video camera to give a picture without impairing both the adequate gradation and the contrast of the picture even in a case where a shot of a negative film is taken.

To attain this object, a video camera arranged as one embodiment of this invention is provided with means for varying a gamma value which is set for use in carrying out gamma correction.

With the video camera arranged in this manner as one embodiment of this invention, the gamma value can be selected according to the kind of film, so that the gamma characteristic of the film can be adjusted close to that of the video camera to give an improved gradation.

The above and other objects and features of this invention will become apparent from the following detailed description of embodiments thereof taken in connection with the accompanying drawings.

BRIEF DESCRIPTION OF THE DRAWINGS

FIG. 7 is a block diagram showing in outline the arrangement of a fourth embodiment of this invention.

FIG. 9 shows the characteristic of a gamma correction process.

FIG. 10(a) is a schematic illustration of an output waveform obtained by using a gamma value of 0.45. FIG. 10(b) is a schematic illustration of an output. waveform obtained by using a gamma value of 1.

FIGS. 15(a) to 15(c) show symbols used in FIGS. 14(a) and 14(b) for showing the directions in which the ray of light is polarized by the double-refraction image pickup apparatus shown in FIG. 13.

FIG. 16 shows by way of example the conventional arrangement of an optical low-pass filter.

FIGS. 17(a) and 17(b) show the polarized states of light outputted from a double refraction element included in a camera apparatus which is arranged as a sixth embodiment of this invention.

DETAILED DESCRIPTION OF THE PREFERRED EMBODIMENTS

Figure 1:
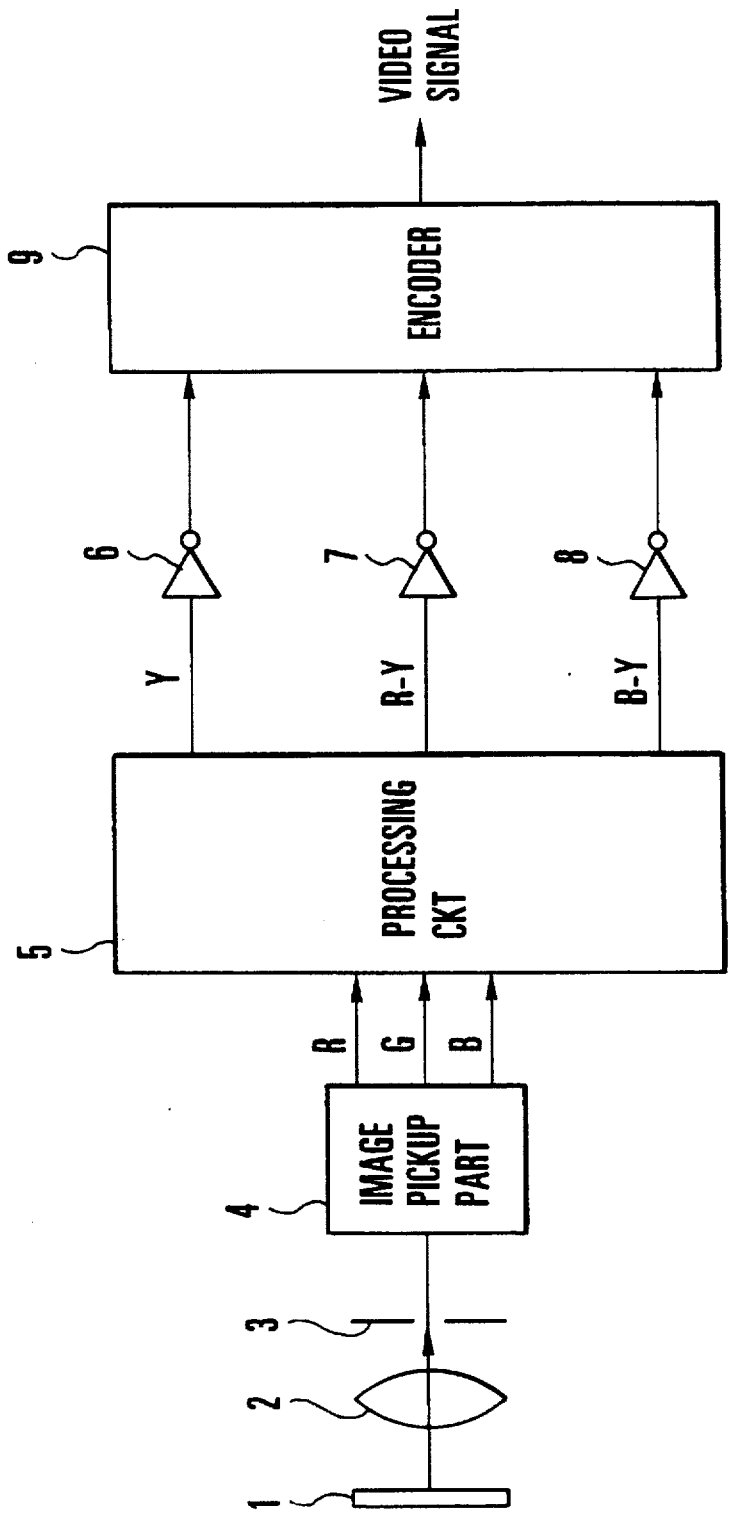
FIG. 1 is a block diagram showing the conventional video camera of the kind having a negative/positive inverting function.
Figure 3:
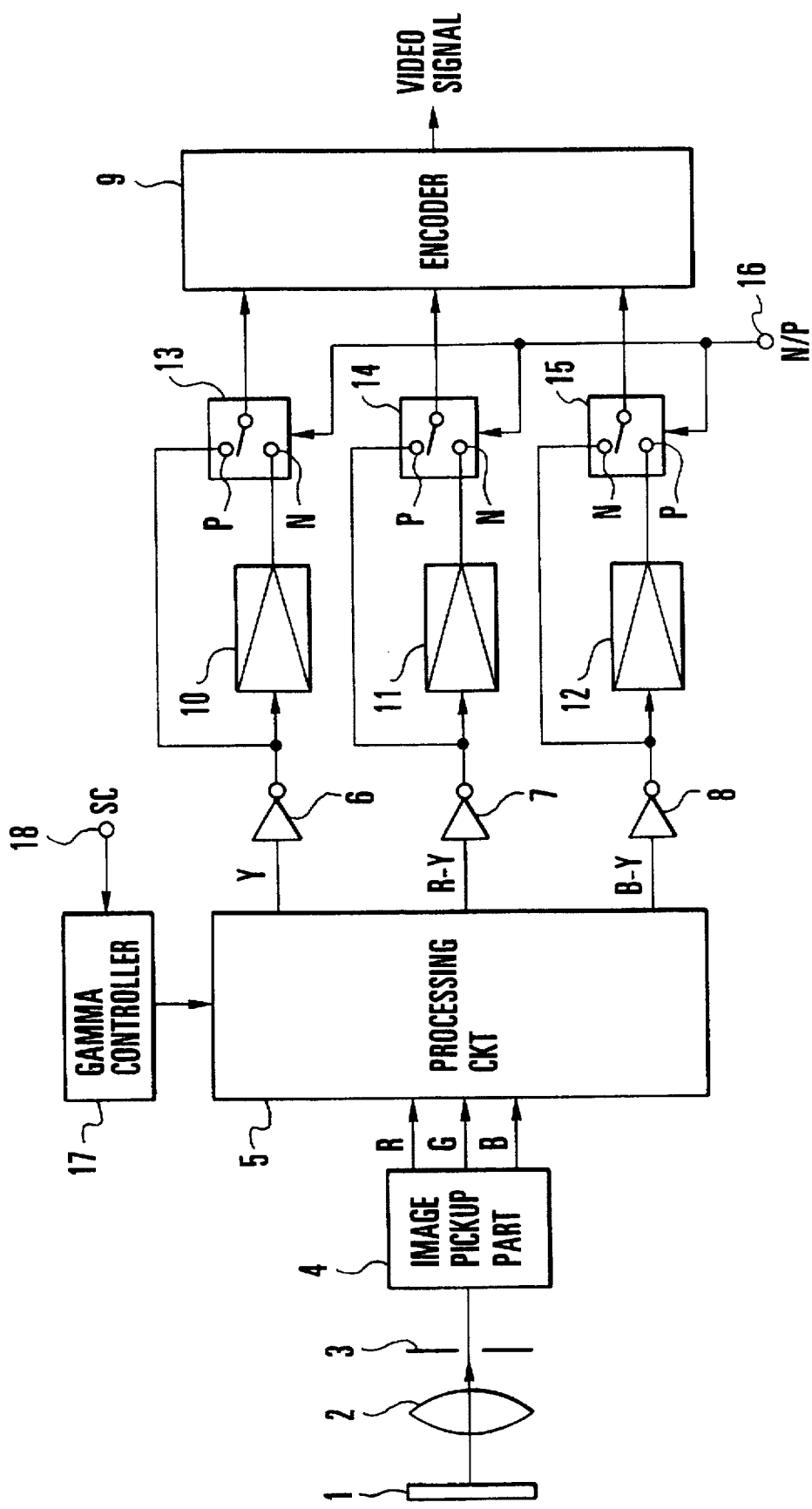
FIG. 3 is a block diagram showing a first embodiment of this invention.

FIG. 3 shows in a block the arrangement of a video camera which is arranged according to this invention as a first embodiment thereof. In FIG. 3, all parts corresponding to the parts of FIG. 1 are indicated by the same reference numerals. The details of these parts are omitted from the following description.

Referring to FIG. 3, amplifiers 10, 11 and 12 are arranged to amplify respectively the outputs of inversion circuits 6, 7 and 8. Switches 13, 14 and 15 are arranged to supply either the outputs of the amplifiers 10, 11 and 12 or the outputs of the inversion circuits 6, 7 and 8 to an encoder 9 by selectively switching these outputs. Each of the switches 13, 14 and 15 has contacts N and P and is arranged to be selectively connected either to the contact N or to the other contact P in accordance with a negative-positive mode switching signal N/P.

A gamma controller 17 is arranged to change gamma values to be used for gamma correction by the processing circuit 5 from one value over to the other for a negative mode or for a positive mode. A gamma value is thus generated in accordance with a control signal SC applied to a terminal 18. The gamma value thus obtained is supplied to a gamma correction circuit included in the processing circuit 5.

The operation of the video camera arranged in this manner is described as follows. The operation is assumed to have two modes. One is called a negative mode in which a negative film is used as a shooting object 1. The other is called a positive mode in which an ordinary object is used as a shooting object.

In the negative mode, the switches 13, 14 and 15 are closed on the side of their contacts N by means of the negative-positive mode switching signal N/P. The gamma controller 17 selects one gamma value which is close to the gamma characteristic of the video camera and gives the gamma value selected to the processing circuit 5.

Figure 4:
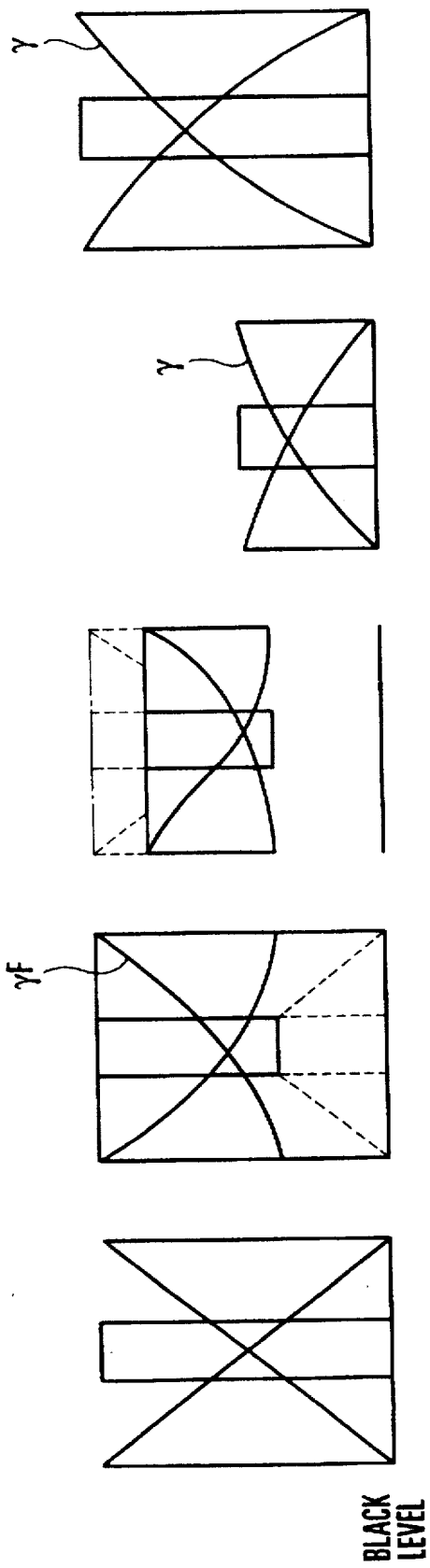
FIGS. 4(a) to 4(e) show the operation of the first embodiment of this invention.

FIGS. 4(a) to 4(e) show waveforms obtained by the various parts of the video camera. FIG. 4(c) shows a waveform obtained through the process of the gamma correction circuit. FIG. 4(d) shows a waveform compressed after the inverting process. In this instance, the gamma value is given by the gamma controller 17.

Figure 2:
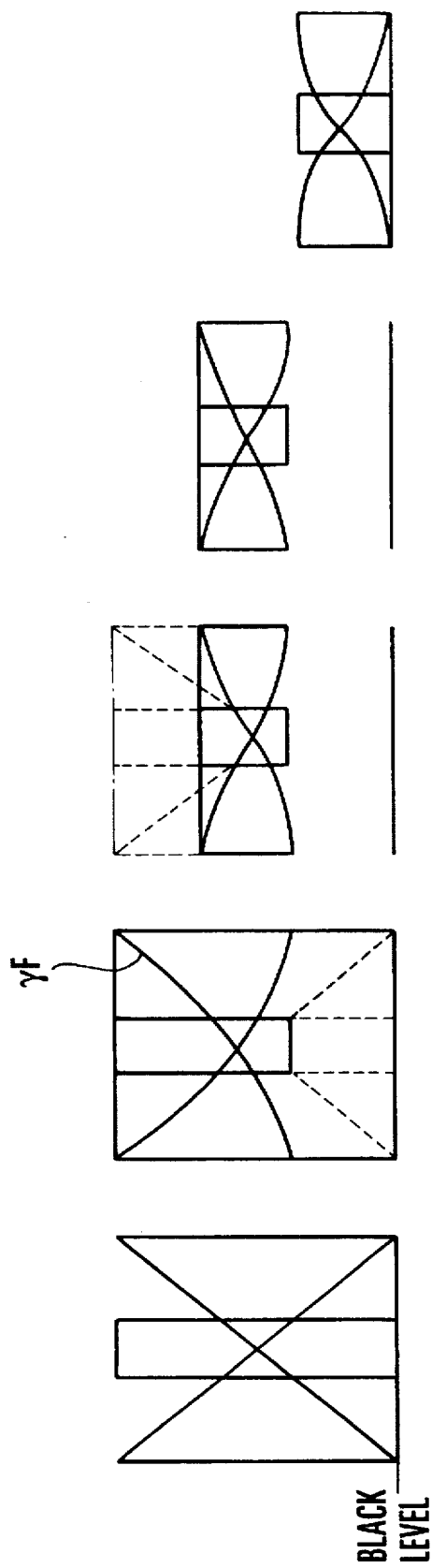
FIGS. 2(a) to 2(e) are waveform charts showing the operation of the video camera shown in FIG. 1.

Next, the compressed waveform is amplified by the amplifier 10, 11 or 12 to bring it to a normal level as shown in FIG. 4(e). The waveform shown in FIG. 4(e) shows a gamma characteristic which is close to the gamma characteristic of the video camera. Therefore, the gradation of pictures can be improved as compared with the gradation attainable by the conventional arrangement. Further, since the waveform is amplified, the embodiment gives a brighter picture with improved contrast as compared with the waveform shown in FIG. 2(e).

In the positive mode, the connecting positions of the switches 13, 14 and 15 are shifted to their contacts P to isolate the amplifiers 10, 11 and 12. If the image of an ordinary object is picked up by using the amplifiers 10, 11 and 12 and signals are inverted, the video camera would give an unnatural inverted image with its bright and dark parts deprived of details by an excessive contrast. To prevent this trouble, the embodiment is arranged to isolate the amplifiers 10, 11 and 12 from the operation.

Figure 5:
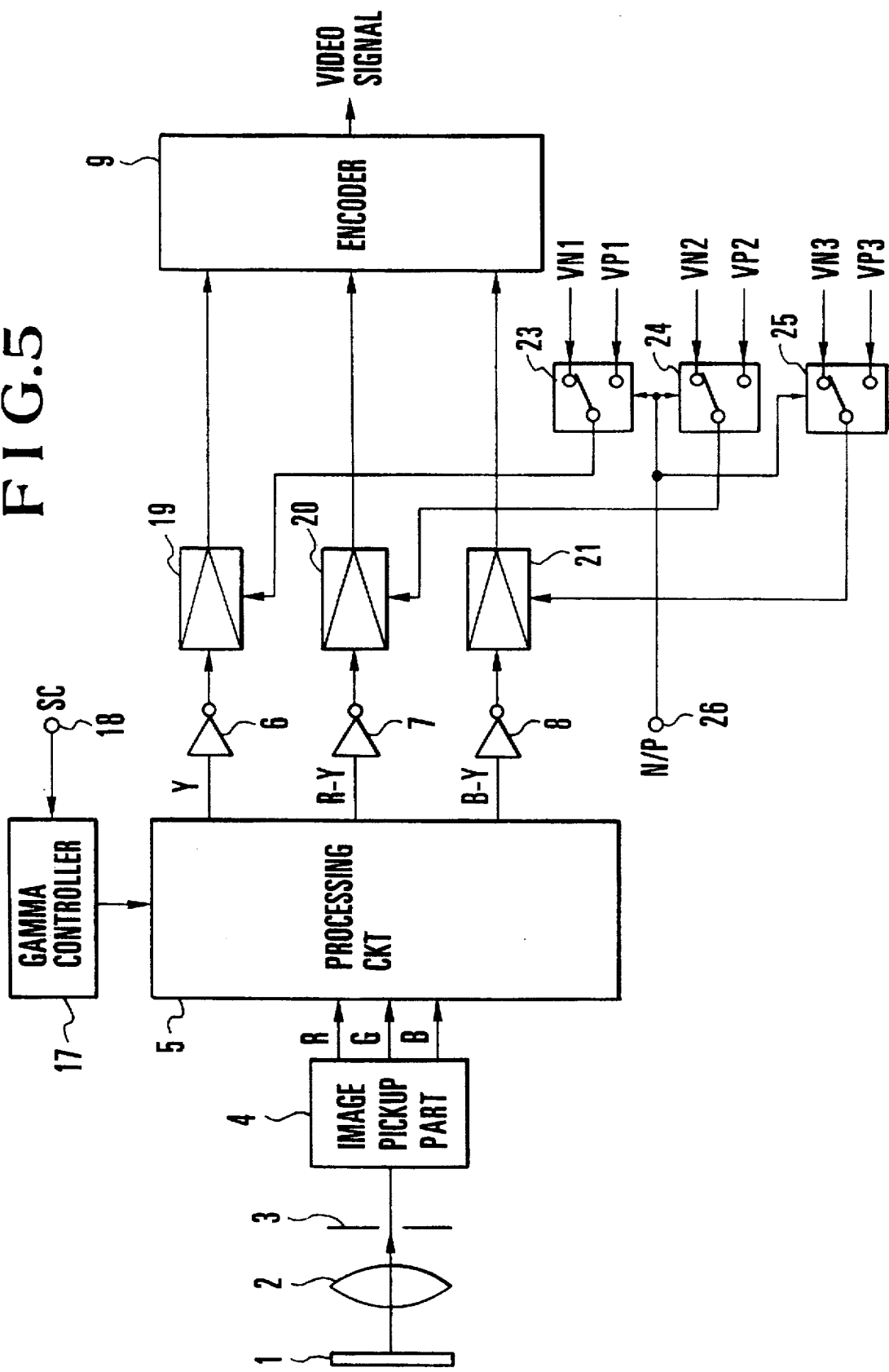
FIG. 5 is a block diagram showing a second embodiment of this invention.

FIG. 5 shows in a block diagram a video camera arranged as a second embodiment of this invention. Referring to FIG. 5, the second embodiment is provided with variable gain amplifiers 19, 20 and 21 for amplifying the outputs of inversion circuits 6, 7 and 8. Switches 23, and 24 and 25 are provided for applying gain control voltages to these variable gain amplifiers 19, 20 and 21. These switches 23, 24 and 25 are arranged to select gain control voltages VN1, VN2 and VN3 when the video camera is in a negative mode and gain control voltage VP1, VP2 and VP3 when the video camera is in a positive mode, in accordance with a switching signal. N/P applied, to a terminal 26.

The arrangement described above enables the second embodiment to give the same advantageous effect as the first embodiment by causing the variable gain amplifiers 19, 20 and 21 to have larger gains in the negative mode than in the positive mode. Incidentally, the values of the gain control voltages VN1 to VN3 and VP1 to VP3 are arranged to be variable as desired.

Meanwhile, use of a negative film as a shooting object 1 presents a problem which is as follows: The gamma characteristic of the negative film is inconstant, because of differences in kind and in development time of films. Such inconstancy is unavoidable and cannot be, adequately coped with by the gamma controller 17.

In the case of the first embodiment, since the gamma characteristic of the negative film is inconstant, the level to which the signals are to be amplified after the process of inversion is also inconstant and varying. It is, therefore, necessary either to set the amplifying amount of each amplifier for every negative film or to set a fixed amplifying amount for a standard negative film and not to adopt any measures for any negative film other than the standard negative film. The problem is, therefore, still left unsolved by such arrangement.

Figure 6:
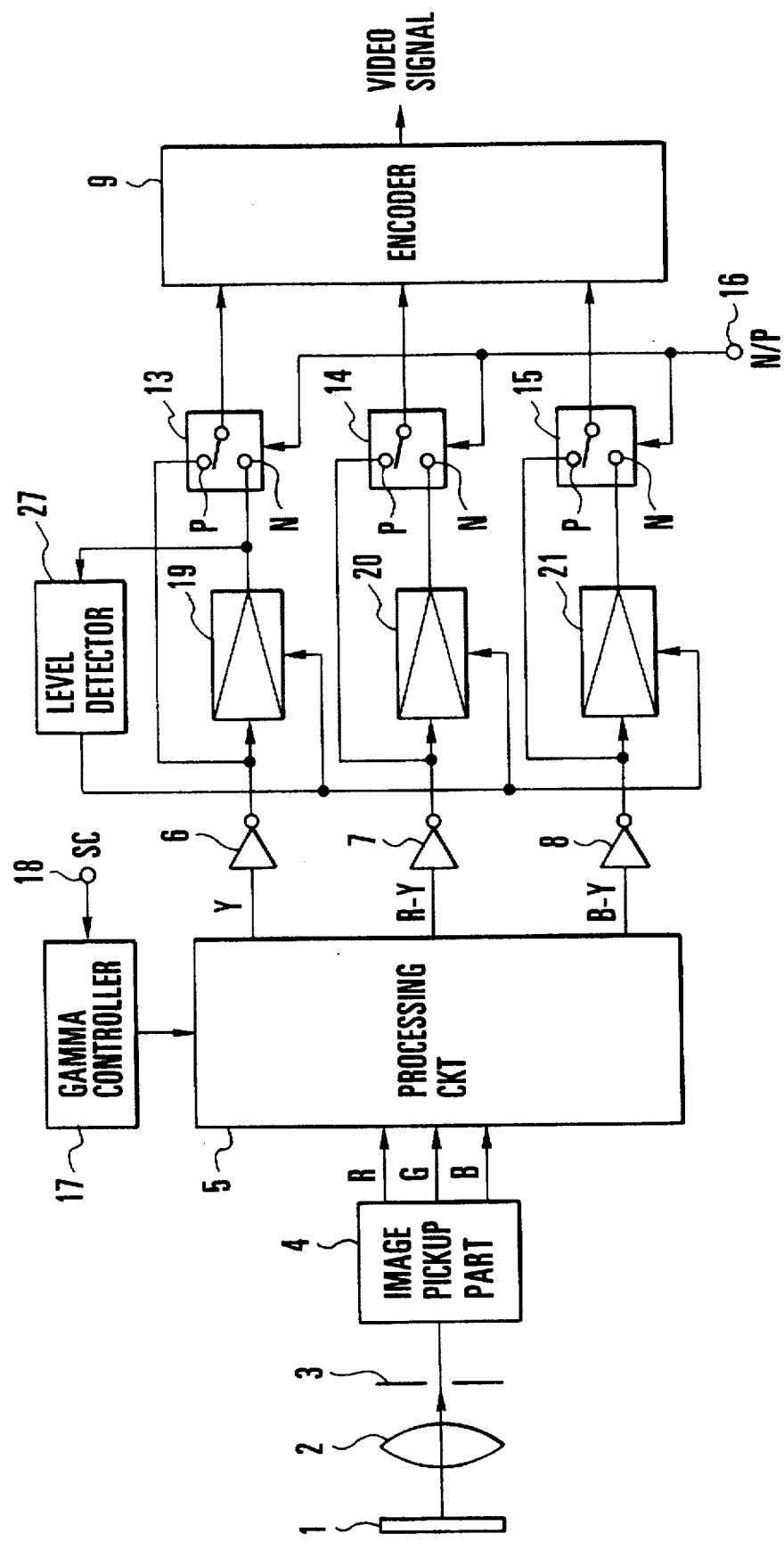
FIG. 6 is a block diagram showing a third embodiment of this invention.

FIG. 6 shows a video camera which is arranged as a third embodiment of this invention and to be capable of solving the above-stated problem. Referring to FIG. 6, variable gain amplifiers 19, 20 and 21 are arranged as the amplifiers to be operated after the inversion by inversion circuits 6, 7 and 8. A level detector 27 is disposed on the output side of the variable gain amplifier 19. The output level of each of the variable gain amplifiers 19, 20 and 21 is thus caused to become constant by controlling the gain of the variable gain amplifiers 19, 20 and 21 on the basis of a level detected by the level detector 27.

According to the arrangement described above, a control signal for controlling the gain of the variable gain amplifier 19 which is provided for a luminance signal Y is sent also to other variable gain amplifiers which are provided for color-difference signals R-Y and B-Y. The gains of the variable gain amplifiers 20 and 21 are thus controlled by the same gain control amount as the gain control amount used for the luminance signal Y to make their output levels constant.

In the case of the third embodiment, only the luminance signal Y is used as a signal source for feedback control and the gains of the color-difference signals R-Y and B-Y are controlled to be at constant levels by using information on the luminance signal Y as well as for control over the luminance signal Y. The invention is not limited to this arrangement, which may be changed to have feedback control systems arranged separately for the signals Y, R-Y and B-Y.

With respect to the detecting method of the level detector 27, the detecting method may be selected from among a group of conceivable methods including a peak detection method, an average value detection method and a peak average value detecting method. In consideration of the characteristics of negative films, the peak detection method permits better detection among others. This is because a peak level obtained after the negative film is inverted corresponds to a black part in the negative state and the black color is suited for use as a reference level as its possible values are limited to finite values.

In each of the first, second and third embodiments, the amplifiers 11 and 12 or the variable gain amplifiers 20 and 21 for the color-difference signals are disposed after the inversion circuits 7 and 8. However, they may be disposed before the inversion circuits 7 and 8, because these color-difference signals R-Y and B-Y are arranged to be merely inverted. Further, the color-difference signals R-Y and B-Y may be arranged to be amplified after they are modulated to remove color burst signals and are added together, instead of merely amplifying them before modulation by the encoder 9 like in the cases of the first, second and third embodiments. The arrangement of the video camera can be amplified by this modification as the number of amplifiers for a color signal can be reduced to only one by the modification. The inverting process for the color signal system also may be changed to invert the color-difference signals R-Y and B-Y after they are modulated for removal of color burst signals and before amplifying the color-difference signals R-Y and B-Y.

In the case of the description given above, the amplifiers to be used after the inverting process are discretely arranged for the luminance signal and the color-difference signals. However, a single amplifier can be arranged in place of these discrete amplifiers. For example, the single amplifier may be arranged to operate after the luminance signal and the color-difference signals are mixed by the encoder 9 and before a color burst signal and a synchronizing signal are mixed in.

Further, in the cases of the first, second and third embodiments described above, the negative/positive inverting process is performed while the operation is in the stage of processing the luminance and color-difference signals. However, the negative/positive inverting process and the amplifying process may be arranged to be carried out in the stage of processing the R, G and B signals.

The first embodiment is arranged to permit the gamma value to be changed. This arrangement permits improvement in gradation and prevention of the color of picture from becoming too light in a case where a negative film is to be inverted.

In the cases of the second and third embodiments, amplifiers are arranged within an inversion circuit system. This arrangement gives a picture with a sharp contrast in inverting a negative film. Further, control over the gains of amplifiers also gives a good picture irrespective of the kind and developed state of the film.

FIG. 7 shows in outline the arrangement of a camera apparatus which is arranged as a fourth embodiment of this invention. In this case, this invention is assumed to be applied, for example, to a black-and-white video camera for simplification of description. The illustration covers only a signal processing system.

Referring to FIG. 7, light from an object which is not shown comes to fall on an image pickup part 32 as an incident optical signal through a lens 31. The image pickup part 32 converts the incident optical signal into an electrical image pickup signal. The electrical image pickup signal outputted from the image pickup part 32 is subjected to a necessary process at a preprocessing part 33. The signal thus processed is sent to a gamma processing part 34 and an automatic gamma change-over circuit 36. The automatic gamma change-over circuit 36 is arranged to form a control signal according to the average picture level (APL) of the input signal and sends the control signal to the gamma processing part 34.

In accordance with the control signal from the automatic gamma change-over circuit 36, the gamma processing part 34 changes its gamma value and performs a gamma correction process to output a gamma processed signal. The signal outputted from the gamma processing part 34 is sent to an encoder 35. The encoder 35 performs necessary processes on the input signal to convert it into a video signal and outputs the video signal.

The operation of the automatic gamma change-over circuit 36 is described in detail as follows.

At the automatic gamma change-over circuit 36, the APL (average picture level) of the input signal which is linear and is in a state before gamma correction is detected to find whether the input signal represents an image of letters (hereinafter referred to as a letter image) or an image of a natural thing (hereinafter referred to as a natural image). More specifically, a discrimination is made between a letter image and a natural image, for example, by comparing the average value level of the signal before gamma correction with a peak level obtained on the high or low level side or with peak levels obtained on both the high and low level sides of the signal.

Figure 8A:
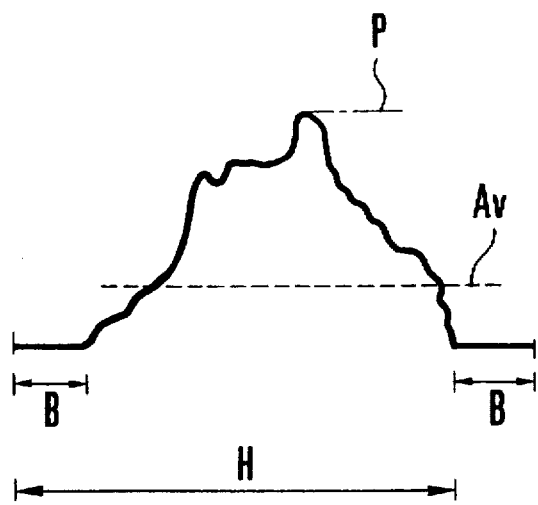
FIG. 8(a) is a waveform chart showing by way of example a waveform obtained from a natural image during one horizontal scanning period.
Figure 8B:
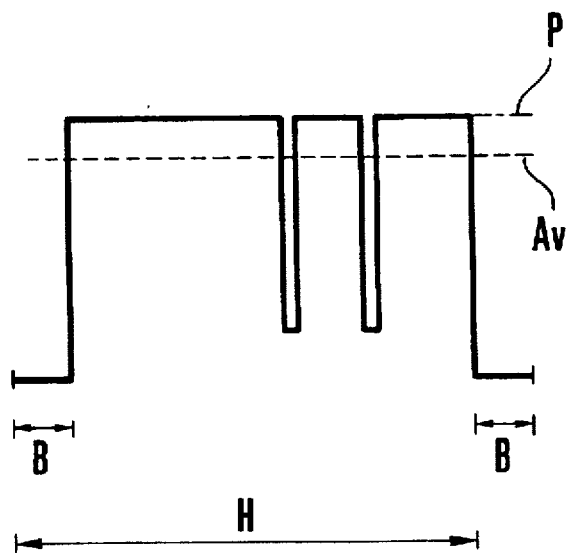
FIG. 8(b) is a waveform chart showing by way of example a waveform obtained from a letter image during one horizontal scanning period.

In a case where the average value level and the peak level are to be compared with each other, for example, the comparison is made in the following manner. The waveform of the natural image and that of the letter image are first briefly described with reference to FIG. 8(a) and 8(b). FIGS. 8(a) shows an example of the natural image waveform obtained during one horizontal scanning period. FIG. 8(b) shows an example of the letter image waveform obtained during one horizontal scanning period.

In the case of the natural image, there is a great difference in level between an average value and a peak value of the whole area of the picture as shown in FIG. 8(a). On the other hand, in the case of the letter image (obtained, in this instance, from letters written in black on white paper), there is only a small difference between an average value and a peak value of the whole area of the picture as shown in FIG. 8(b).

The reason for this is as follows: In the case of the letter image, the peak value becomes the average value of the whole area of the picture, i.e., the level of white paper, if no letter is written on the white paper. When some letters are written on the paper in this state, the average value of the whole picture area decreases by as much as an area which is caused to become black by the letters. However, since the ratio of the area of letters to the whole area of the picture is not much, the difference in level between the average value of the whole picture and the peak value becomes small. In view of this, the fourth embodiment is arranged to make a discrimination between a letter image and a natural image by detecting a level difference between the average value and the peak value.

The gamma value of the gamma processing part 34 is controlled according to the result of the discrimination made in the above-stated manner between a natural image and a letter image. For example, an ordinary gamma value, i.e., 0.45, is used for a natural image and a gamma value of 1 is used for a letter image. The arrangement of setting the gamma value at 1, for example, imparts a contrast to a letter image to make it into a sharper image.

FIG. 9 shows a gamma characteristic attainable by the above-stated arrangement. FIGS. 10(a) and 10(b) show in outline the waveforms obtained by the arrangement. In FIG. 9, the axis of abscissa indicates input levels and the axis of ordinate indicates output levels. Characteristic curves obtained with the gamma value set at 1 and at 0.45 are approximately shown in FIG. 9.

As apparent from FIG. 9, in a case where the input signal represents letters written on a white background, a level difference (contrast) between the level of the white background and that of the letters, as obtained in the output, becomes a difference between a level III and a level I when the gamma value is set at 1 and becomes a difference between the level III and a level II when the gamma value is left at 0.45. The selection of the gamma value of 1 thus gives a greater contrast. The output waveforms thus obtained are as shown in FIGS. 10(a) and 10(b). FIG. 10(a) shows an output waveform obtained with the gamma value set at 0.45 and FIG. 10(b) shows an output waveform obtained with the gamma value set at 1.

In the case of the example described above, the input signal is in the waveform shown in FIG. 8(b). As shown, the waveform indicates the contrast of letters. The letter level does not become completely black in the input signal, because no letter has its reflection factor at "0" and, in the case of small letters, they are buoyed up by the resolutions of the optical system and the image pickup part of the video camera.

Figure 11:
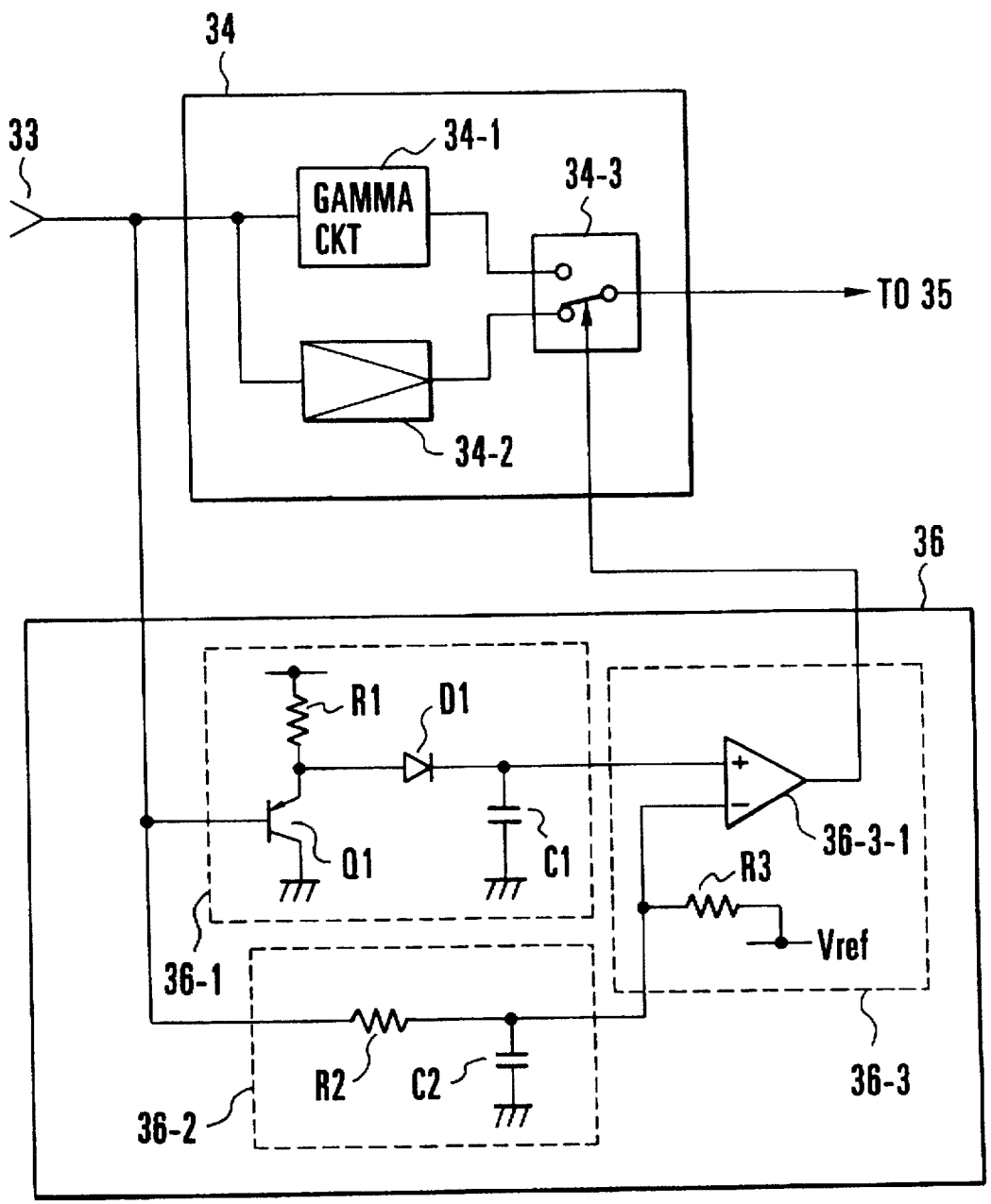
FIG. 11 is a circuit diagram showing by way of example the arrangement of a gamma processing part and an automatic gamma change-over circuit.

The arrangement of the gamma processing part 34 and that of the automatic gamma change-over circuit 36 are described in further detail by way of example with reference to FIG. 11. As shown in FIG. 11, the gamma processing part 33 receives the signal from the preprocessing part 33 and leads it to a gamma circuit 34-1 and also to an amplifier 34-2. The output of the gamma circuit 34-1 and that of the amplifier 34-2 are respectively supplied to a change-over switch 34-3. A middle point of the change-over switch 34-3 is connected to the encoder 35 as an output. The switching action of the change-over switch 34-3 is controlled by a signal coming from the automatic gamma change-over circuit 36.

The gamma circuit 34-1 is a nonlinear processing circuit using an ordinary gamma value which is 0.45. The amplifier 34-2 is a linear circuit provided for adjusting the white level of the signal passing through a system which includes no nonlinear process (passing through the amplifier 34-2) to the white level of the signal passing through the gamma circuit 34-1. Therefore, either a signal for the gamma value of 0.45 or a signal for the gamma value of 1 can be selected by the change-over switch 34-3.

Meanwhile, the signal from the preprocessing part 33 is led also to the automatic gamma change-over circuit 36. As shown in FIG. 11, the automatic gamma change-over circuit 36 is composed of a peak detection circuit 36-1, an average value detection circuit 36-2 and a comparator 36-3. The signal from the preprocessing part 33 comes to both the peak detection circuit 36-1 and the average value detection circuit 36-2. The peak detection circuit 36-1 includes a transistor Q1, a resistor R1, a diode D1 and a capacitor C1. The average value detection circuit 36-2 is composed of a resistor R2 and a capacitor C2.

The output of the peak detection circuit 36-1 and that of the average value detection circuit 36-2 are supplied to the comparator 36-3. The comparator 36-3 is composed of a comparator 36-3-1, a resistor R3, a reference voltage source Vref, etc., as shown in FIG. 11.

The output of the peak detection circuit 36-1 is input-ted to one terminal of the comparator 36-3-1 which is, for example, a positive terminal. The output of the average value detection circuit 36-2 is inputted to the other terminal which is, for example, a negative terminal. Further, the reference voltage source Vref is also connected to the other terminal (negative) of the comparator 36-3-1.

A signal from the reference voltage source Vref is arranged to be mixed with the signal from the average value detection circuit 36-2 before it is inputted to the other terminal (negative) of the comparator 36-3-1, so that the signal from the reference voltage source Vref can be caused to have an offset. The reference voltage source Vref, therefore, can be set in such a manner that -he level of the peak detection output becomes lower than the input level of the other terminal (negative) in a case where the input signal is for a letter image and becomes higher than the input level of the other terminal (negative) when the input signal is for a natural image.

An identification signal for discriminating between a letter image and a natural image is obtained in the above-stated manner and is outputted from the comparator 36-3-1. This signal is used as a control signal for the change-over switch 34-3, so that a good image can be obtained by automatically changing one gamma value over to the other according to the difference between a letter image and a natural image.

While the embodiment has been described on the assumption that the invention is applied to a black-and-white video camera for the sake of simplification, the arrangement described of course applies likewise to a color video camera. In the case of a color video camera, a luminance signal may be used as an input signal for the automatic gamma change-over circuit 36. Further, this invention has been described on the assumption that each embodiment is of an analog signal processing type. However, it will be apparent to those skilled in the art that the invented arrangement likewise applies also to a digital signal processing method.

A fifth embodiment of this invention is next described with reference to FIG. 12, which is a circuit diagram. In the case of a camera apparatus of the kind arranged as shown in FIG. 7, a head part and a signal processing part are separately arranged with the two interconnected by means of a connection cable. The head part is provided with a clock signal generator for driving a synchronizing signal generator which is disposed in the signal processing part. A main clock signal is transmitted from the head part to the signal processing part through the connection cable. However, since the synchronizing (hereinafter referred to as sync) signal generator is a digital circuit, the main clock signal must be transmitted at an amplitude close to the voltage of a power supply. Hence, it is necessary to transmit a signal of a high frequency and a large amplitude through a long connection cable. The connection cable then might act like an antenna to present a problem by discharging some unnecessary electromagnetic wave.

In a case where the camera apparatus is a solid-state image pickup apparatus arranged to have a great number of picture elements, like many products recently marketed, the frequency of the main clock signal becomes high and the unnecessary electromagnetic wave tends to be more readily discharged to worsen the problem. To solve this problem, the fifth embodiment is arranged as shown in FIG. 12. With the exception of the main clock signal transmission system, other signal systems of the fifth embodiment are the same as those of the conventional apparatus. Therefore, FIG. 12 shows only the main clock signal transmission system.

Figure 12:
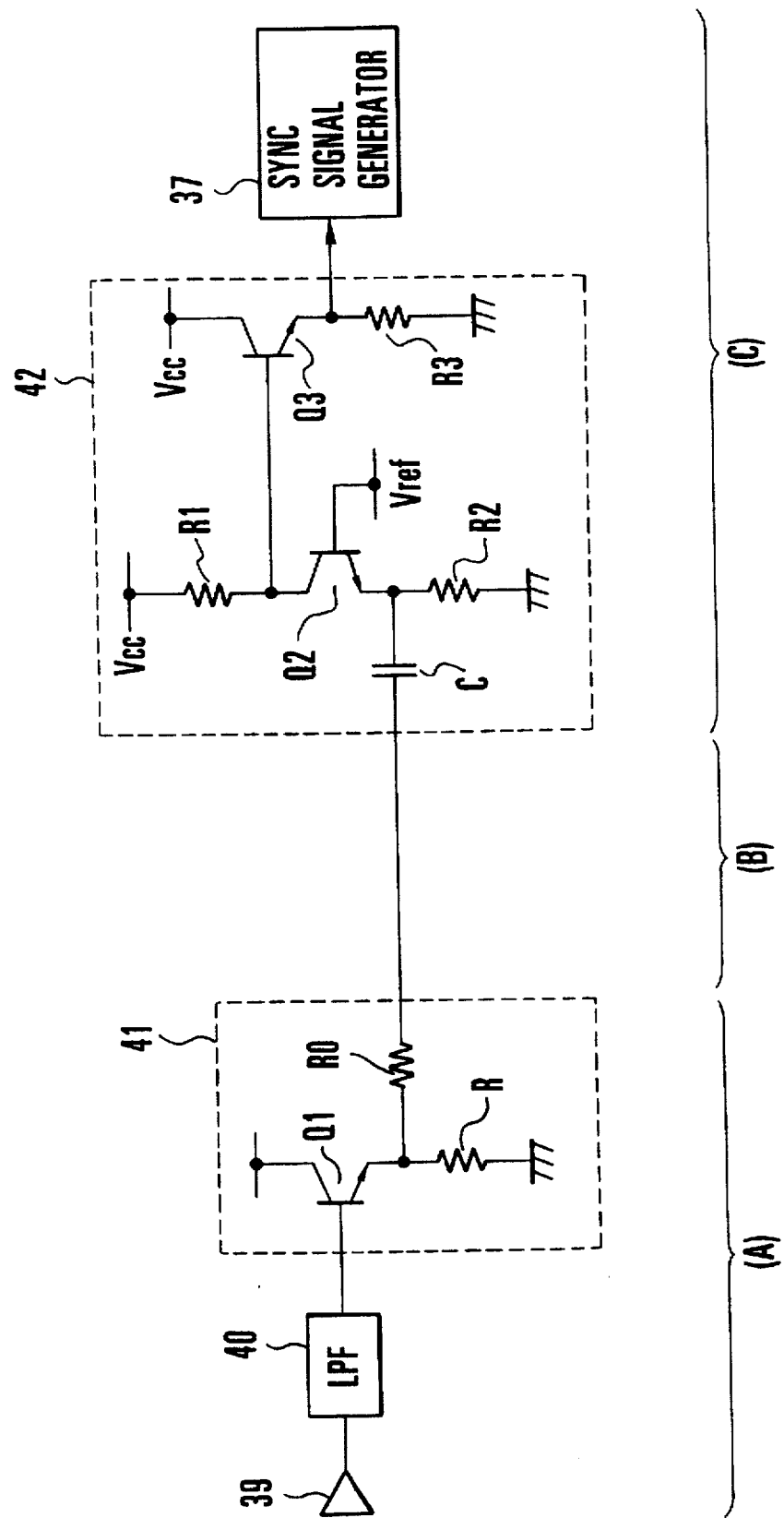
FIG. 12 is a circuit diagram showing a main clock signal transmission system of a camera apparatus which is arranged as a fifth embodiment of this invention.

Referring to FIG. 12, the main clock signal is outputted through a buffer 39. The output of the buffer 39 is applied to a low-pass filter (LPF) 40 to have the basic wave of the main clock signal alone allowed to pass. The output of the low-pass filter 40 is sent to a current driving circuit 41. The low-pass filter 40 may be replaced with a band-pass filter to attain the same effect as the low-pass filter 40. A circuit which is arranged in this manner is disposed within a head part A.

The output of the current driving circuit 41 is sent through a connection cable B to a current amplifier 42 which is disposed within a signal processing part C. The current amplifier 42 is arranged to convert a current into a voltage and to send the voltage to a sync signal generator 37. The current driving circuit 41 is composed of an emitter follower circuit which includes a transistor Q1 and a resistor R. A resistor R0 is connected to the emitter of the transistor Q1 as an output resistor.

The current amplifier 42 is composed of a base grounding circuit which includes a transistor Q2, resistors R1 and R2. The base grounding circuit is arranged, as well known, to convert a current into a voltage according to a ratio between the output resistor R0 of the current driving circuit 41 and the resistor R1. The voltage thus obtained is buffered by an emitter follower circuit which is formed by a transistor Q3 and a resistor R3. After that, the output of the current amplifier 42 is inputted to the sync signal generator 37.

As apparent from the circuit arrangement of FIG. 12, the amplitude of the signal within the connection cable B is zero. An electromagnetic wave is generated, as is well known, by an electric field and a magnetic field. In the case of this embodiment, however, since the amplitude which generates an electric field due to the main clock signal is zero, no electromagnetic wave is generated.

Further, the current amplifier 42 shown in FIG. 12 is provided with a capacitor C for blacking a DC component. A reference voltage Vref is provided for the purpose of adjusting the bias voltage of the current amplifier 42 to a suitable value.

In the field of video cameras or the like, it has recently become a general practice to use a solid-state image sensor for an image pickup apparatus on account of its reliability and compactness, etc. Meanwhile, also in the field of video cameras, efforts for a higher degree of resolution have been progressing year after year. This trend has become salient particularly after the announcement of a so-called "high-vision" TV.

With a solid-state image sensor employed, the resolution is determined by the number of picture elements of the image sensor. Therefore, an increase of the resolution is limited. Besides, taking cost and yield into consideration, the resolution is increasable, at the most, to the level of the resolution of image sensors currently used for TV sets of the NTSC color system.

In view of the above-stated difficulty, image pickup apparatuses of the kind utilizing a double refracting effect, called double-refraction type image pickup apparatuses, have been developed to attain a high level of resolution equal to that of the "high-vision" TV set or the like by using image sensors which are available without difficulty by the current level of technology.

Figure 13:
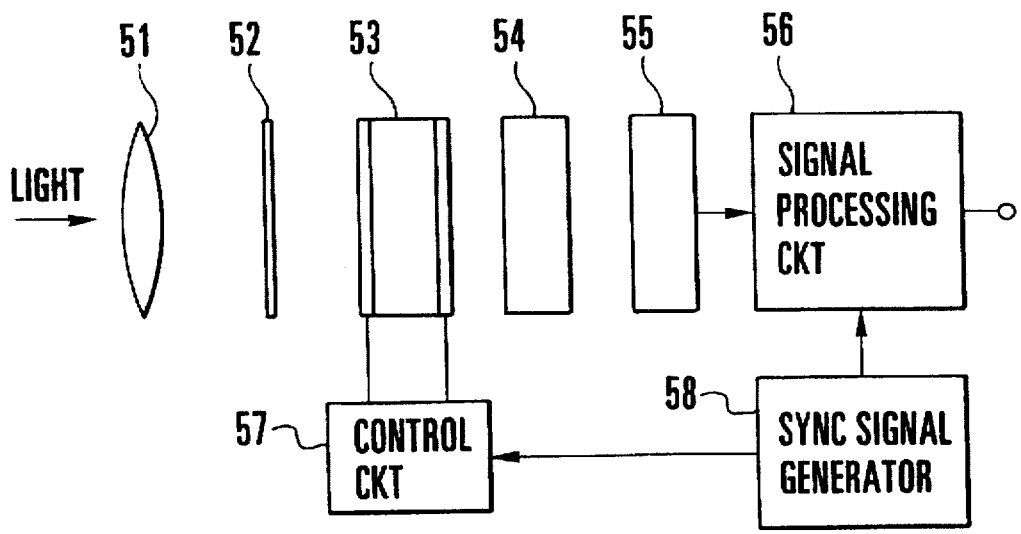
FIG. 13 is a block diagram showing by way of example the arrangement of the conventional double-refraction image pickup apparatus.

The double-refraction type image pickup apparatus is arranged as follows. A polarizing element, a voltage-controlled polarizing element (such as a liquid crystal) and a double-refraction element are inserted in an optical path between an image pickup lens which forms an object image on an image pickup plane as an optical image and an image sensor which converts the optical image into an electrical signal. The voltage-controlled polarizing element is controlled, for example, for every frame or field to rotate a polarization plane 90 degrees in such a way as to equivalently increase the resolution by optically moving the image position on the image pickup plane. FIG. 13 shows an example of this arrangement of the double-refraction type image pickup apparatus.

Referring to FIG. 13, light from the object comes to fall on an image sensor 55 through a lens 51, a polarizing element 52, a voltage-controlled polarizing element 53 and a double refraction element 54. A signal outputted from the image sensor 55 is supplied to a signal processing circuit 56 to be subjected to necessary processes at the signal processing circuit 56. The processed signal is outputted as a video signal.

The voltage-controlled polarizing element 53 is voltage-controlled, for example, for every frame by a control circuit 57 to have the polarization plane caused to rotate 90 degrees. The control circuit 57 is arranged to control its output voltage in accordance with the output of a sync signal generator 58.

Figure 14A:
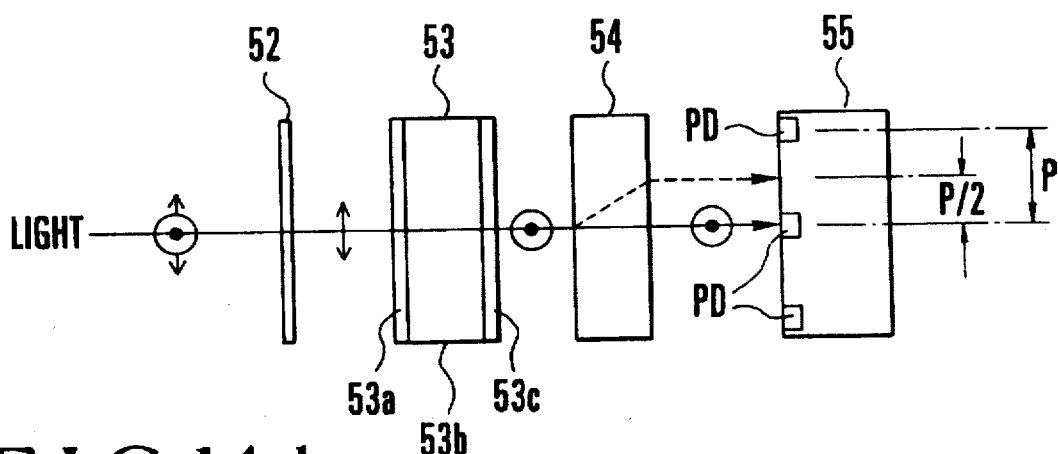
FIGS. 14(a) and 14(b) show the polarized states of rays of light obtained by applying a voltage to a voltage-controlled polarizing element included in the double-refraction image pickup apparatus and by not applying any voltage to the voltage-controlled polarizing element, respectively.
Figure 14B:
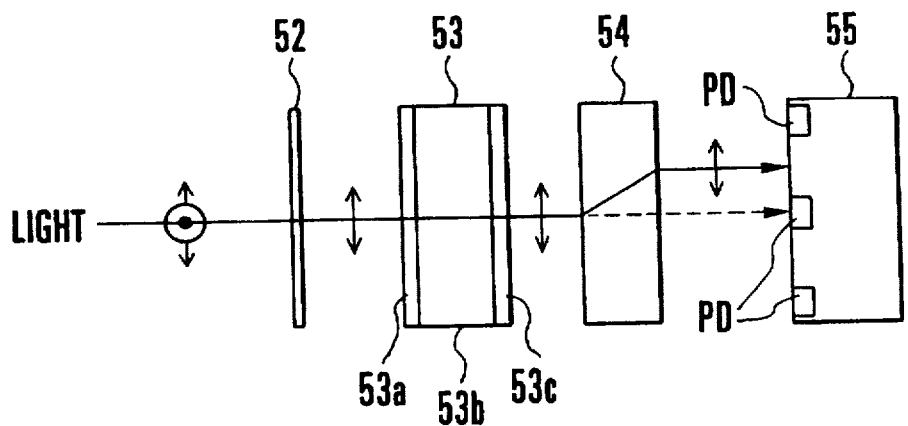

The operation of the double-refraction type image pickup apparatus is described with reference to FIGS. 13, 14(a) and 14(b) as follows. FIGS. 14(a) and 14(b) show the arrangement and actions of the elements disposed in the optical path between the polarizing element 52 and the image sensor 55 in relation to the polarized state of light. The voltage-controlled polarizing element 53 is formed with a liquid crystal unit 53b sandwiched in between a pair of transparent electrodes 53a and 53c. When no voltage is applied between the transparent electrodes 53a and 53c, the light passing through the voltage-controlled polarizing element 53 has its polarization plane rotated 90 degrees. When a predetermined voltage is applied between the transparent electrodes 53a and 53c, the light is allowed to pass without rotating its polarization plane.

FIG. 14(a) shows the image pickup apparatus in a state obtained with no voltage applied to the voltage controlled polarizing element 53. The light is natural light and is not polarized until it reaches the polarizing element 52. In FIG. 14(a), a direction which is perpendicular to the paper surface of the drawing (hereinafter referred to as the direction A) and a direction which is in parallel to the paper surface of the drawing (hereinafter referred to as the direction B) are respectively indicated by marks shown in FIGS. 15(a) and 15(b). Further, a composite direction between the directions A and B (hereinafter referred to as the direction C) is indicated by a mark shown in FIG. 15(c).

The polarizing element 52 is arranged, for example, to pass light coming in the direction of B. As a result, light incident on the voltage-controlled polarizing element 53 is polarized in the direction of B. Since no voltage is applied to the voltage-controlled polarizing element 53 in the case of FIG. 14(a), the light transmitted has its polarization plane rotated 90 degrees and becomes polarized light in the direction A.

This light from the voltage-controlled polarizing element 53 comes to fall on the double refraction element 54. The double refraction element 54 is composed of, for example, crystal, etc., and is arranged such that, when natural light falls thereon, the light is outputted in a state of being split and separated into ordinary and extraordinary rays of light. The ordinary ray of light is then polarized perpendicular to the separating direction (in the direction A, in this instance). The extraordinary ray of light is polarized in a direction parallel to the separating direction (in the direction B, in this instance). As a result, an optical path passing through the double refraction element 54 becomes an optical path indicated by a full line in the drawing.

In the case of FIG. 14(b) which shows the apparatus in a state obtained with a voltage applied to the voltage-controlled polarizing element 53, the light passing the voltage-controlled polarizing element 53 is not caused to have its polarization plane rotated as no voltage is applied. Therefore, the light passing through the voltage-controlled polarizing element 53 comes to fall on the double refraction element 54 in the state of being polarized in the direction B. The double refraction element 54 then causes the light to trace an optical path indicated by a full line in the drawing until it reaches the image sensor 55.

With a voltage applied to the voltage-controlled polarizing element 53, the position of the ray of light reaching the image sensor 55 thus deviates as much as the width of separation by the double refraction element 54 from the position obtained without applying any voltage to the voltage-controlled polarizing element 53. Therefore, the width of separation is set at a width (P/2) which is ½ of the pitch P at which the photoelectric converting photodiodes of the image sensor 55 are arranged. The length of sampling interval equivalently becomes ½. In other words, the number of sampling points can be increased by two times by virtue of this arrangement to give an image with a higher degree of resolution.

The double-refraction type image pickup apparatus of the kind described is sometimes provided with an optical element which brings about polarization, such as an optical low-pass filter or the like, for the purpose of lessening an aliasing noise of sampling by the image sensor 55. The optical low-pass filter is, for example, made of crystal or the like and is arranged to give a double refracting effect. FIG. 16 shows an example of the optical low-pass filter which is simply arranged using one piece of crystal. The optical low-pass filter 59 acts in the same manner as the double refraction element 54 of the double-refraction type image pickup apparatus described above. When natural light falls on the optical low-pass filter 59, the incident light goes out in a state of being divided into an ordinary ray of light and an extraordinary ray of light, as shown in FIG. 16.

If the separating width of the two outgoing rays of light is small, an image formed with these rays of light added together on an image forming plane spreads to show a blurred state. In other words, the optical low-pass filter 59 serves to lower a spatial frequency. Further, in FIG. 16, the marks used in the foregoing description of the double-refraction type image pickup apparatus indicate in the same manner the polarized directions of the rays of light shown in the drawing.

However, as apparent from the above, when such optical low-pass filter 59 is added to the double refraction type image pickup apparatus, the addition renders one of them unfunctioning. This is because both of them use the double refracting effect and their output rays of light are polarized. One of them disposed behind the other is unable to bring about any effect by utilizing the polarization. For example, in a case where the optical low-pass filter 59 is disposed directly in front of the solid-state image sensor, the rays of light incident on the optical low-pass filter 59 has already been polarized to make the rays of light no longer separable or splittable by the optical low-pass filter 59. Such arrangement thus renders the optical low-pass filter 59 inoperative as a low-pass filter.

A sixth embodiment of this invention is arranged to solve this problem and is capable of effectively implementing its intrinsic function to give an image with a high degree of resolution even in cases where some other polarizing element such as a low-pass filter is added.

A camera apparatus which is arranged as the sixth embodiment of this invention is described below with reference to FIGS. 19, 17(a) and 17(b).

In the case of the sixth embodiment, the camera apparatus includes a polarizing element 52, a voltage-controlled polarizing element 53 and a double refraction element 54 which are disposed in an optical path between an image pickup lens 51 (see FIG. 13) and a solid-state image sensor 55. Further, as shown in FIG. 19, an optical low-pass filter 59 is disposed in the optical path on the front side of the solid-state image sensor 55 with a phase plate 60 inserted in front of the optical low-pass filter 59. This phase plate 60 is formed by using a crystal in a manner which is well known. Therefore, the details of the phase plate 60 are omitted from description.

The camera apparatus which is arranged as the sixth embodiment of this invention operates as follows. In FIG. 19, the rays of light are schematically indicated by full lines when no voltage is applied to the voltage-controlled polarizing element 53 and by broken lines when a voltage is applied to the voltage-controlled polarizing element 53. A part of the operation up to the output of the double refraction element 54 along the optical path is fundamentally the same as the prior art arrangement. That part is, therefore, omitted from the following description.

The polarized directions of the light outputted from the double refraction element 54 are as shown in FIG. 17(a), which schematically shows these directions as viewed by facing the image sensor 55. A square outside frame of the drawing is shown for the sake of expediency.

Figure 19:
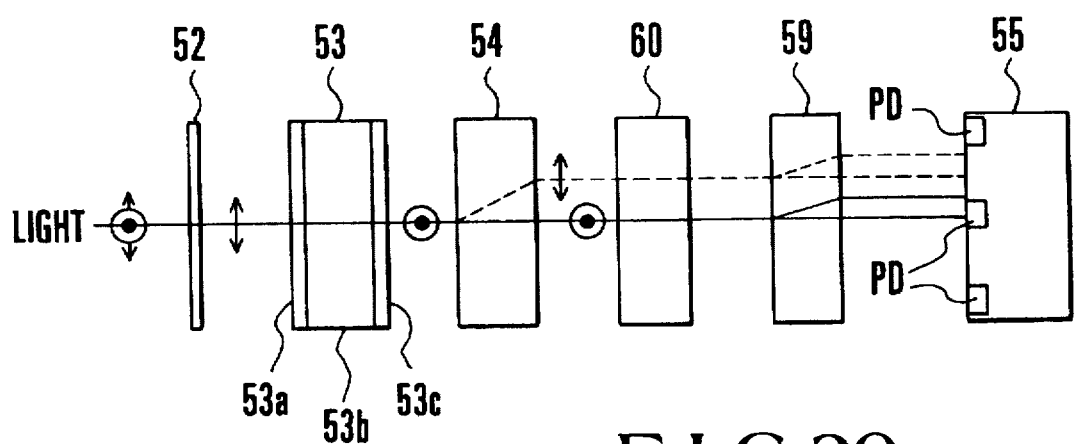
FIG. 19 is a block diagram showing the arrangement of essential parts of the camera apparatus arranged as the sixth embodiment of this invention.

As apparent from the description of the prior art, a ray of light 61 which corresponds to the full line of FIG. 19 is horizontally polarized as shown on FIG. 17(a). A ray of light 62 which corresponds to the broken line of FIG. 19 is perpendicularly polarized as shown in FIG. 17(a). FIG. 17(b) shows these rays of light in a state of having their polarization planes rotated 45 degrees by the phase plate 60. As apparent from FIGS. 17(a) and 17(b), the 45 degree rotation of the polarization plane causes the rays of light outputted from the phase plate 60 to have horizontal and perpendicular components for every one of the rays of light 61 and 62. Therefore, when the rays of light fall on the optical low-pass filter 59 which is composed of a double refraction element, etc., each of the rays of light 61 and 62 can be separated to enable the optical low-pass filter 59 to effectively carry out its function.

While the sixth embodiment is arranged to have the optical low-pass filter 59 disposed in rear of a double refraction block provided for higher resolution, this positional arrangement may be reversed for attaining the same advantageous effect. Further, in a case where an optical low-pass filter or the like is to be used in combination with a double-refraction type image pickup apparatus, the spatial frequency characteristic of the optical low-pass filter of course must be changed from a spatial frequency characteristic which is obtained when the optical low-pass filter is singly used.

The invented arrangement is effective in cases where an optical element which brings forth polarized light is included. The arrangement is advantageous for polarized light generated at the time of color separation by means of a dichroic filter or the like. For example, the arrangement is suited and advantageous for a three plate camera or the like.

It is an object of this invention to prevent the polarization planes of polarizing devices from becoming orthogonal or parallel to each other in a case where a high resolution image pickup apparatus which utilizes double refraction (polarization) is provided with an additional polarizing element. Therefore, the arrangement of preventing polarization planes from becoming orthogonal or parallel to each other obviates the necessity of having a phase plate even in a case where the apparatus includes a polarizing element other than the polarizing element which is provided for higher resolution. The two polarization planes can be prevented from becoming orthogonal or parallel to each other to give a good high resolution image, for example, by obliquely setting the direction in which an image is to be moved for high resolution, i.e., by carrying out sampling in an offset manner with respect to both the horizontal and vertical directions of the image. For example, with a sensor of the so-called NTSC or PAL system used, resolution can be enhanced by this arrangement both in the horizontal and vertical directions to give an artificial "high-vision" image.

Figure 18:
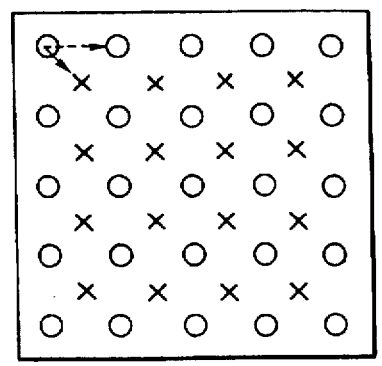
FIG. 18 shows the polarized state of the output light of the double refraction element of the sixth embodiment obtained through a phase plate.

In that instance, an image separating direction for high resolution and another image separating direction for the low-pass filter are in a relation which is schematically shown in FIG. 18. In FIG. 18, a full line arrow mark indicates the direction in which the image is moved for higher resolution. A broken line arrow mark indicates the direction in which the image is moved for the low-pass filter. Further, marks "o" indicate sampling points on one side of the image movement for higher resolution. Marks "x" indicate sampling points on the other side of the image movement.

In the fourth embodiment which is, as described in the foregoing, a camera apparatus using a video camera, a discrimination is automatically made between a letter image input and a natural image input. In the case of the letter image input, the gamma value is changed from an ordinary gamma value so that a good letter image can be obtained with an adequate contrast. Meanwhile, for the natural image input, a good dynamic range can be obtained in the same manner as the conventional apparatus.

In the fifth embodiment which is, as described in the foregoing, a head-separating type camera apparatus, a current driving circuit is disposed on the side of the head part and a current amplifying circuit on the side of the signal processing part. A main clock signal is arranged to be transmitted through the current driving circuit and the current amplifying circuit. By this, signal amplitude within the connection cable is suppressed to zero, so that the electromagnetic wave radiated from the connection cable can be greatly reduced.

In the sixth embodiment which is, as described above, a high resolution image pickup apparatus of the kind using double refraction, a phase plate and the double refracting direction for attaining high resolution are arranged in such a way as to allow a light polarizing element to effectively implement its function even in a case where the light polarizing element is provided for another purpose, so that an image having a high degree of resolution can be obtained without difficulty.

Next, a seventh embodiment of this invention is described as follows. In this case, the invention is applied to a solid-state image pickup apparatus having an image pickup lens arranged to form an image of an object of shooting on an image pickup plane and a solid-state image sensor arranged to photoelectrically convert the image formed by the image pickup lens. In the image pickup apparatus, a polarizing element, a voltage-controlled polarizing element and a double refraction element are disposed in an optical path between the image pickup lens and the solid-state image sensor. In addition to these elements, a control circuit is arranged to apply a voltage to the voltage-controlled polarizing element at a predetermined timing and to control the polarized state of light passing through the voltage-controlled polarizing element at the predetermined timing. A signal processing device is arranged to compose an image according to the control state of the control circuit.

In the seventh embodiment, the voltage-controlled polarizing element does not cause the polarization plane of light passing there to rotate when a voltage is applied but causes the polarization plane of the light to rotate when a voltage is not applied. With the voltage applied to the voltage-controlled polarizing element at the predetermined timing, the positions of rays of light arriving at the solid-state image sensor through the double refraction element come to deviate from each other as much as the separating width of the double refraction element. Therefore, the optical path is dividable without recourse to a mechanical driving mechanism.

The seventh embodiment is further described with reference to FIGS. 20, 21(a) and 21(b) as follows.

Figure 20:
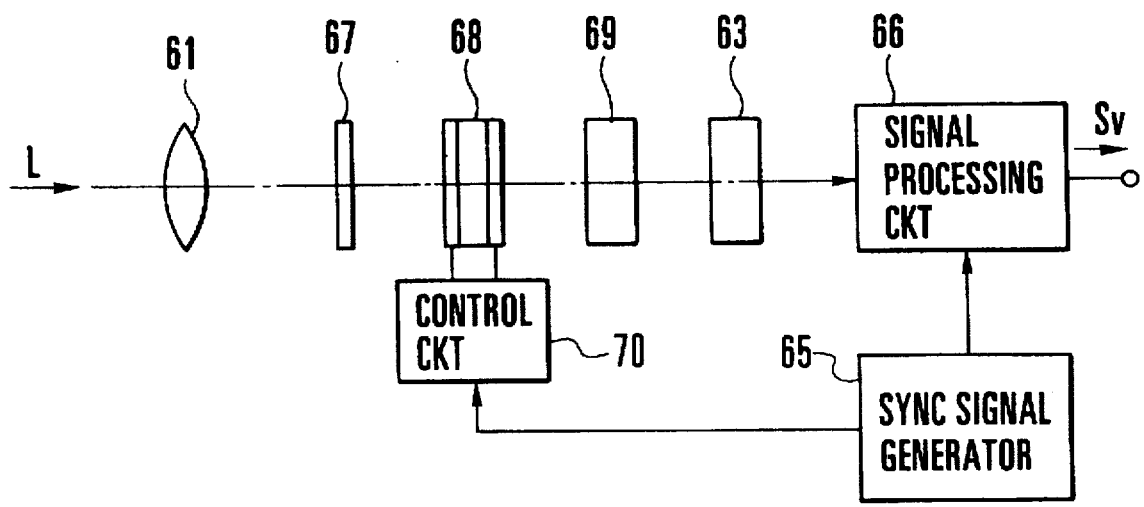
FIG. 20 is a block diagram showing the arrangement of a solid-state image pickup apparatus arranged as a seventh embodiment of this invention.

FIG. 20 is a block diagram showing in outline the arrangement of the solid-state image pickup apparatus arranged as the seventh embodiment. Referring to FIG. 20, the light L coming from the object reaches the solid-state image sensor 63 through the lens 61, the polarizing element 67, the voltage-controlled polarizing element 68 and the double refraction element 69.

A signal outputted from the solid-state image sensor 63 is supplied to the signal processing circuit 66 to be subjected to necessary processes. After these processes, the processed signal is outputted as a video signal Sv. The voltage-controlled polarizing element 68 is voltage-controlled by a control circuit 70, for example, for every frame, to cause the polarization plane to rotate 90 degrees. The control circuit 70 controls its output voltage on the basis of the output of a sync signal generator 65.

Next, the operation of the solid-state image pickup apparatus arranged as the seventh embodiment is described with reference to FIGS. 20, 21(a) and 21(b).

Figure 21A:
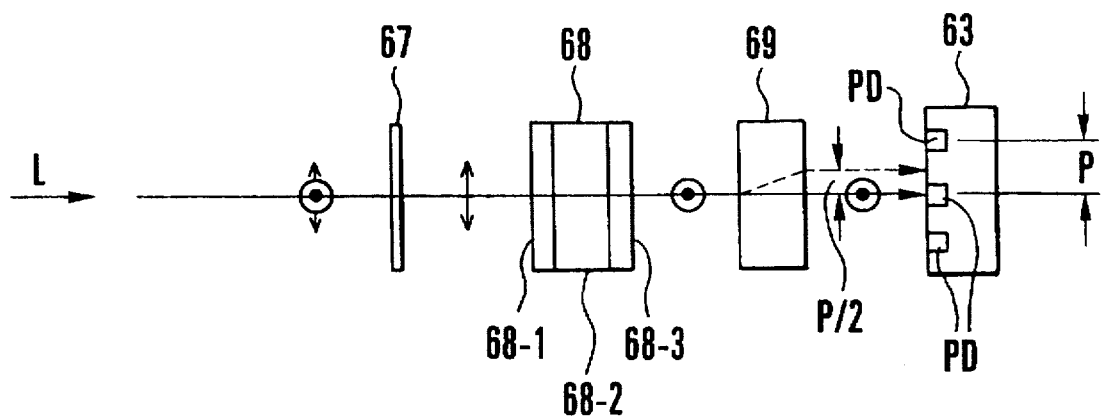
FIG. 21(a) shows the arrangement of the essential parts of the solid-state image pickup apparatus and a state of an optical path obtained when no voltage is applied to a voltage-controlled polarizing element.
Figure 21B:
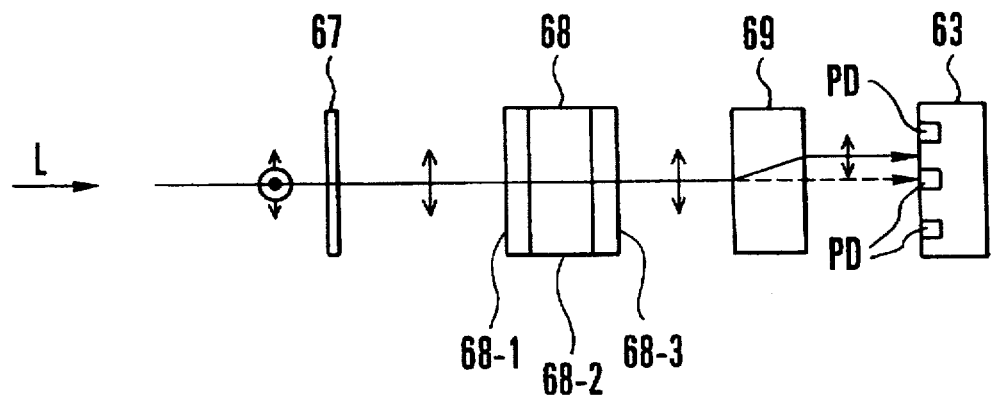
FIG. 21(b) shows the arrangement of the essential parts and a state of the optical path of the solid-state image pickup apparatus obtained when a voltage is applied to the voltage-controlled polarizing element.

FIGS. 21(a) and 21(b) show in further detail the elements disposed in the optical path leading from the polarizing element 67 to the solid-state image sensor 63 by schematically showing the polarization of light in such a way as to make the operation easily understandable.

One example of arrangement of the voltage-controlled polarizing element 68 is first described. The voltage-controlled polarizing element 68 is formed with a liquid crystal unit 68-2 sandwiched in between a pair of transparent electrodes 68-1 and 68-3. The light passing through this element 68 has its plane of polarization rotated 90 degrees when no voltage is applied between the transparent electrodes 68-1 and 68-3 and is allowed to pass through this element without having its polarization plane rotated when a voltage is applied.

The operation performed when no voltage is applied to the voltage-controlled polarizing element 68 is first described with reference to FIG. 21(a). The light is natural light and not polarized before its arrival at the polarizing element 67. This state of light is schematically shown by combining a mark indicating a direction which is perpendicular to the paper surface of the drawing (a mark representing the front of an arrow) and a mark indicating a direction which is parallel to the paper surface of the drawing (arrows indicating vertical directions in the drawing). The polarizing element 67 is arranged to pass, for example, light which is in parallel to the paper surface. In that case, light incident on the voltage-controlled polarizing element 68 is polarized in parallel to the paper surface, that is, in the vertical direction as viewed on the drawing.

When no voltage is applied to the voltage-controlled polarizing element 68, the polarization plane of the transmission light rotates 90 degrees to become light polarized in the direction perpendicular to the paper surface of the drawing. This polarized light comes to fall on the double refraction element 69.

The double refraction element 69 is composed of crystal, for example, and is arranged such that, when natural light falls thereon, the light is outputted in a state of being split and separated into ordinary and extraordinary rays of light. The ordinary ray of light is polarized to pass through the double refraction element 69 perpendicular to the direction of separation (in this case, perpendicular to the paper surface of the drawing). The extraordinary ray of light is polarized to pass parallel to the direction of separation (parallel to the paper surface, in this case). Therefore, the optical path passing through the double refraction element 69 becomes as shown by a full line in the drawing.

When a voltage is applied to the voltage controlled polarizing element 68, the operation is performed as described below with reference to FIG. 21(b).

With a voltage applied, light passing through the voltage-controlled polarizing element 68 is not caused to rotate its plane of polarization. The light passing through the voltage-controlled polarizing element 68 comes to fall on the double refraction element 69 in a state of being polarized parallel to the paper surface of the drawing.

At the double refraction element 69, the light is caused by the property of the double refraction element 69 to go along the optical path indicated by a full line to come to the solid-state image sensor 63.

Therefore, the position of the ray of light reaching the solid-state image sensor 63 with the voltage applied to the voltage-controlled polarizing element 68 deviates from that of the ray of light reaching there with no voltage applied as much as the width of separation caused by the double refraction element 69.

The width of separation is set, for example, at a width (P/2) which is ½ of the pitch P of a photoelectric converting photodiodes PD of the solid-state image sensor 63. By this arrangement, the length of sampling interval can be shortened to ½ (the number of sampling points is increased by two times), so that images can be obtained with higher resolution.

The method for restoring an image by combining optically deviating images can be carried out in a known manner and is, therefore, omitted from description. The timing at which a voltage is to be applied to the voltage-controlled polarizing element 68 (for every frame) can be set in the same manner as the conventional arrangement and is, therefore, also omitted from description.

The embodiment described above is arranged to change one image over to another for every frame. The change-over timing, however, may be changed to change the image for every field. Further, in the seventh embodiment, the spatial separating direction of the image requires no particular attention. For example, in the case of the conventional video system, such as the NTSC or PAL system, horizontal resolution can be improved with the image separated in the horizontal direction of the image.

Further, in a case where this invention is applied to an image input for a "high-vision" system or a computer, the image is separated either in the vertical direction of the image or in an oblique direction obtained by combining horizontal and vertical directions, such application can be made by just slightly modifying the signal processing circuit 66 which is arranged in rear of the solid-state image sensor 63.

The embodiment described is arranged to have the polarizing element, the voltage-controlled polarizing element and the double refraction element in the optical path between the image pickup lens and the solid-state image sensor, to control the polarized state of light passing through the voltage-controlled polarizing element by applying a voltage to the voltage-controlled polarizing element at a predetermined timing and to compose an image according to the control state of the control circuit. Therefore, the rotating state of the polarization plane of the light passing through the voltage-controlled element can be varied by applying and not applying a voltage to the voltage-controlled polarizing element. By virtue of this arrangement, the positions of the rays of light arriving at the solid-state image sensor can be shifted as much as the width of separation by the double refraction element. The optical path thus can be separated without recourse to a mechanical driving mechanism. Therefore, a solid-state image pickup apparatus which is capable of giving images with high resolution can be simply arranged without any mechanical driving mechanism.

What is claimed is:

1. An image pickup apparatus comprising:
   a) an image sensor;
   b) signal processing means arranged to perform a predetermined signal processing action including a gamma correction process on an image signal outputted from said image sensor and to invert the image signal during the process of the signal processing action;
   c) operation means for receiving said signal outputted from said image sensor and for operating an average level of the whole image signals outputted from said image sensor;
   d) determining means for determining whether the image defined therein has letters content or non-letters content by comparing the average level with a peak level of the whole image signals; and
   e) selecting means for selecting from plural different gamma values a gamma value to be used for the gamma correction process in accordance with a determination made by said determining means.

2. An apparatus according to claim 1, wherein said signal processing means further includes amplifying means for amplifying said inverted signal.

3. An apparatus according to claim 2, wherein said signal processing means further includes switch means for receiving the amplified inverted signal and the inverted signal without amplification and operable for selectively outputting either received signal.

4. An apparatus according to claim 2, wherein said signal processing means further includes level detection means for detecting a level of the amplified inverted signal.

5. An apparatus according to claim 4, wherein said amplifying means comprises a variable gain amplifier and wherein said signal processing means controls the gain of said variable gain amplifier correspondingly with the level detected by said level detection means.

6. An apparatus according to claim 2, wherein said amplifying means comprises a variable gain amplifier and wherein said signal processing means selectively controls said variable gain amplifier to have respective different gains.

7. An apparatus according to claim 6, wherein said signal processing means includes switch means having first and second different voltage levels applied thereto and selectively operable for outputting either level and wherein said signal processing means controls said variable gain amplifier at said respective different gains correspondingly with the level output from said switch means.

8. An image pickup apparatus comprising:

a) an image sensor;

b) operation means for receiving an image signal outputted from said image sensor and for operating an average level of the whole image signals outputted from said image sensor;

c) determining means for determining whether the image defined therein has letters content or non-letters content by comparing the average level with a peak level of whole image signals;

d) a signal inversion circuit arranged to perform a predetermined signal processing action on the image signal outputted from said image sensor in accordance with a determination made by said determining means and to invert the image signal during the process of the signal processing action; and e) at least one amplifier arranged in a signal system passing through said signal inversion circuit.

9. An apparatus according to claim 8, wherein said amplifier is a variable gain amplifier, and further comprising level detecting means for detecting an output level of said variable gain amplifier and controlling a gain of said variable gain amplifier in accordance with the detected output level.

10. A camera apparatus comprising:

a) a lens arranged to form an optical image of an object on an image pickup plane;

b) image pickup means arranged to photoelectrically convert the optical image formed by said lens into an image signal;

c) operation means for operating an average level of the whole image signals converted by said image pickup means;

d) discriminating means for discriminating, by comparing the average level with a peak level of the whole image signals, whether the image signal was obtained by picking up an image of letter or by picking up an image not comprising letters;

e) a gamma processing circuit arranged to perform a gamma correction process on the level of the image signal obtained from said image pickup means, said gamma processing circuit having at least two different gamma values selectably settable;

f) an encoder arranged to convert an output of said gamma processing circuit into a video signal and to output the video signal; and g) an automatic gamma switching circuit arranged to automatically set one of the gamma values settable in said gamma processing circuit according to a result of the discrimination made by said discriminating means.

11. An image pickup apparatus, comprising:

a) an image sensor;

b) signal processing means arranged to perform a non-linear processing action on an image signal outputted from said image sensor;

c) operation means for receiving said image signal outputted from said image sensor and for operating an average level of the whole image signals outputted from said image sensor;

d) determining means for determining whether the image defined therein has letters content or non-letters content by comparing the average level with a peak level of the whole image signals; and e) control means for controlling said non-linear processing action in accordance with a determination made by said determining means.

12. An apparatus according to claim 11, wherein said signal processing means further includes amplifying means for amplifying said signal.

13. An apparatus according to claim 12, wherein said signal processing means further includes switch means for receiving the amplified signal and the signal without amplification and operable for selectively outputting either received signal.

14. An apparatus according to claim 12, wherein said signal processing means further includes level detection means for detecting a level of the amplified signal.

15. An apparatus according to claim 14, wherein said amplifying means comprises a variable gain amplifier and wherein said signal processing means controls the gain of said variable gain amplifier correspondingly with the level detected by said level detection means.

16. An apparatus according to claim 12, wherein said amplifying means comprises a variable gain amplifier and wherein said signal processing means selectively controls said variable gain amplifier to have respective different gains.

17. An apparatus according to claim 16, wherein said signal processing means includes switch means having first and second different voltage levels applied thereto and selectively operable for outputting either level and wherein said signal processing means controls said variable gain amplifier at said respective different gains correspondingly with the level output from said switch means.

18. An image signal processing apparatus, comprising:

a) signal input means for inputting an image signal;

b) signal processing means arranged to perform a non-linear processing action on said image signal;

c) operation means for receiving said image signal inputted by said signal input means and for operating an average level of the whole image signals inputted by said signal input means;

d) comparison means for comparing the average level with a peak level of the whole image signals; and e) control means for controlling said non-linear processing action in accordance with a comparison made by said comparison means.

19. An apparatus according to claim 18, wherein said signal processing means further includes amplifying means for amplifying said signal.

20. An apparatus according to claim 19, wherein said signal processing means further includes switch means for receiving the amplified signal and the signal without amplification and operable for selectively outputting either received signal.

21. An apparatus according to claim 19, wherein said signal processing means further includes level detection means for detecting a level of the amplified signal.

22. An apparatus according to claim 21, wherein said amplifying means comprises a variable gain amplifier and wherein said signal processing means controls the gain of said variable gain amplifier correspondingly with the level detected by said level detection means.

23. An apparatus according to claim 19, wherein said amplifying means comprises a variable gain amplifier and wherein said signal processing means selectively controls said variable gain amplifier to have respective different gains.

24. An apparatus according to claim 23, wherein said signal processing means includes switch means having first and second different voltage levels applied thereto and selectively operable for outputting either level and wherein said signal processing means controls said variable gain amplifier at said respective different gains correspondingly with the level output from said switch means.

* * * * *

UNITED STATES PATENT AND TRADEMARK OFFICE
CERTIFICATE OF CORRECTION

PATENT NO. : 5,764,287
DATED : June 9, 1998
INVENTOR(S) : Tatsumi

It is certified that error appears in the above-identified patent and that said Letters Patent are hereby corrected as shown below:

On the title page: Item [54] and Column 1, line 3, delete "VALVE" and insert -- VALUE --.

Col. 1, line 32, delete "BY" and insert -- B-Y --.

Col. 2, line 25, delete "$\gamma$" and insert -- $\gamma$ F --.

Col. 2, line 63, delete "Ls" and insert -- is --.

Col. 4, line 27, delete ".".

Col. 10, line 6, delete "input-ted" and insert -- inputted --.

Col. 10, line 19, delete "-he" and insert -- the --.

Signed and Sealed this

Eighth Day of December, 1998

Attest:

Attesting Officer

BRUCE LEHMAN

Commissioner of Patents and Trademarks